(12) United States Patent
McGrath

(10) Patent No.: US 6,306,781 B1
(45) Date of Patent: Oct. 23, 2001

(54) EXPANSION JOINT PATCH APPARATUS

(75) Inventor: David F. McGrath, Garden Ridge, TX (US)

(73) Assignee: Senior Investments AG (CH)

(*) Notice: Subject to any disclaimer, the term of this patent is extended or adjusted under 35 U.S.C. 154(b) by 0 days.

(21) Appl. No.: 09/358,748

(22) Filed: Jul. 21, 1999

(51) Int. Cl.[7] .................................................. B32B 27/04
(52) U.S. Cl. .................... 442/149; 29/402.3; 29/402.09; 156/94; 427/29; 427/37; 427/43; 427/140; 428/36.1; 428/144; 428/145; 428/149; 428/293.4; 442/69; 442/92; 442/129; 442/157; 442/180; 442/88; 442/104; 442/155; 442/168; 442/170; 442/173; 442/174
(58) Field of Search .................................. 428/36.1, 144, 428/145, 149, 293.4; 442/69, 92, 129, 149, 157, 180, 88, 104, 155, 168, 170, 171, 173, 174; 29/402.3, 402.09; 156/94; 427/140, 37, 43, 29

(56) References Cited

U.S. PATENT DOCUMENTS

| | | |
|---|---|---|
| 768,477 | 8/1904 | McKinley . |
| 1,704,760 | 3/1929 | Parker . |
| 2,529,411 | 11/1950 | Northrup . |
| 3,439,945 * | 4/1969 | Chambers et al. ................ 285/373 |
| 3,734,139 | 5/1973 | Zafiroglu . |
| 3,770,556 | 11/1973 | Evans et al. . |
| 3,779,854 * | 12/1973 | Dukert et al. ........................ 161/156 |
| 3,913,625 | 10/1975 | Gazda et al. . |
| 3,934,064 | 1/1976 | Lowthian . |
| 3,996,085 | 12/1976 | Barnes et al. . |
| 4,116,743 * | 9/1978 | Davis .................... 156/333 |
| 4,188,979 | 2/1980 | Nakamura et al. . |
| 4,359,502 | 11/1982 | Caponigro et al. . |
| 4,370,393 | 1/1983 | Watanabe et al. . |
| 4,403,796 * | 9/1983 | Ledbetter et al. ................ 285/223 |
| 4,424,246 | 1/1984 | Pieslak et al. . |
| 4,464,425 | 8/1984 | Voigt et al. . |
| 4,485,136 | 11/1984 | Koch et al. . |
| 4,584,233 | 4/1986 | Meader, Jr. . |
| 4,652,475 | 3/1987 | Haney et al. . |
| 4,673,002 | 6/1987 | Scanlon et al. . |
| 4,688,603 | 8/1987 | Donnerhack et al. . |
| 4,696,332 | 9/1987 | Koch . |
| 4,732,196 | 3/1988 | Koch et al. . |
| 4,732,412 | 3/1988 | van der Linden et al. . |
| 4,756,337 | 7/1988 | Settineri . |
| 4,803,104 | 2/1989 | Peigneur et al. . |
| 4,942,906 | 7/1990 | Igarashi et al. . |
| 4,959,251 | 9/1990 | Owens et al. . |
| 5,052,449 | 10/1991 | Fukuda et al. . |
| 5,068,920 | 12/1991 | Bray . |
| 5,075,149 | 12/1991 | Owens et al. . |
| 5,091,230 | 2/1992 | Fuchs et al. . |
| 5,129,429 | 7/1992 | Winter et al. . |
| 5,230,937 * | 7/1993 | Effenberger et al. ................ 428/113 |
| 5,284,184 | 2/1994 | Noone et al. . |
| 5,316,046 | 5/1994 | Igarashi et al. . |
| 5,348,801 | 9/1994 | Venzi et al. . |
| 5,372,163 | 12/1994 | Kokuryu et al. . |

(List continued on next page.)

Primary Examiner—Elizabeth M. Cole
Assistant Examiner—Arti R. Singh
(74) Attorney, Agent, or Firm—Dick and Harris

(57) ABSTRACT

An expansion joint patch apparatus for repairing failed or torn expansion joint belting having a substantially flat, woven substrate material, and a cured solution of suspended elastomer, coating the substrate material. The substrate material is selected from the group consisting of aramid, fiberglass, corrosion resistant alloy wire, polyester, ceramic and kevlar fabrics. The elastomer material is selected from the group consisting of chloroprene, chlorosulfonated polyethylene, ethylene propylene, chlorinated isobutylene isoprene, fluoroelastomers and silicone rubbers. The invention further includes a method for forming a fluoroelastomer patch for repairing fabric expansion joints.

3 Claims, 2 Drawing Sheets

U.S. PATENT DOCUMENTS

| | | |
|---|---|---|
| 5,406,871 | 4/1995 | Lambert, Jr. . |
| 5,437,899 | 8/1995 | Quigley . |
| 5,482,087 | 1/1996 | Overbergh et al. . |
| 5,484,173 | 1/1996 | Baker . |
| 5,488,974 | 2/1996 | Shiota et al. . |
| 5,488,975 | 2/1996 | Chiles et al. . |
| 5,520,223 | 5/1996 | Iorio et al. . |
| 5,554,425 | 9/1996 | Krause et al. . |
| 5,560,398 | 10/1996 | Pfleger . |
| 5,611,373 | 3/1997 | Ashcraft . |
| 5,632,307 | 5/1997 | Fawley et al. . |
| 5,638,871 | 6/1997 | Iorio et al. . |
| 5,639,528 | 6/1997 | Feit et al. . |
| 5,647,400 | 7/1997 | Jani et al. . |
| 5,660,660 | 8/1997 | Greuel, Jr. et al. . |
| 5,662,974 | 9/1997 | Andrenacci et al. . |
| 5,671,778 | 9/1997 | Sakuragi et al. . |
| 5,671,780 | 9/1997 | Kertesz . |
| 5,698,056 | 12/1997 | Kamiyama et al. . |
| 5,706,861 | 1/1998 | Wood et al. . |
| 5,706,865 | 1/1998 | Douchet . |
| 5,713,392 | 2/1998 | O'Rourke . |
| 5,731,069 | 3/1998 | Delle Donne et al. . |
| 5,732,743 | 3/1998 | Livesay . |
| 5,743,304 | 4/1998 | Mitchell et al. . |
| 5,786,053 | 7/1998 | Andrenacci et al. . |
| 5,795,634 | 8/1998 | Fukui . |
| 5,798,158 | 8/1998 | Koike et al. . |
| 5,827,587 * | 10/1998 | Fukushi et al. ............... 428/36.6 |
| 5,839,241 * | 11/1998 | Cacossa et al. ............... 52/255 |
| 5,855,977 * | 1/1999 | Fukushi et al. ............... 428/36.6 |

\* cited by examiner

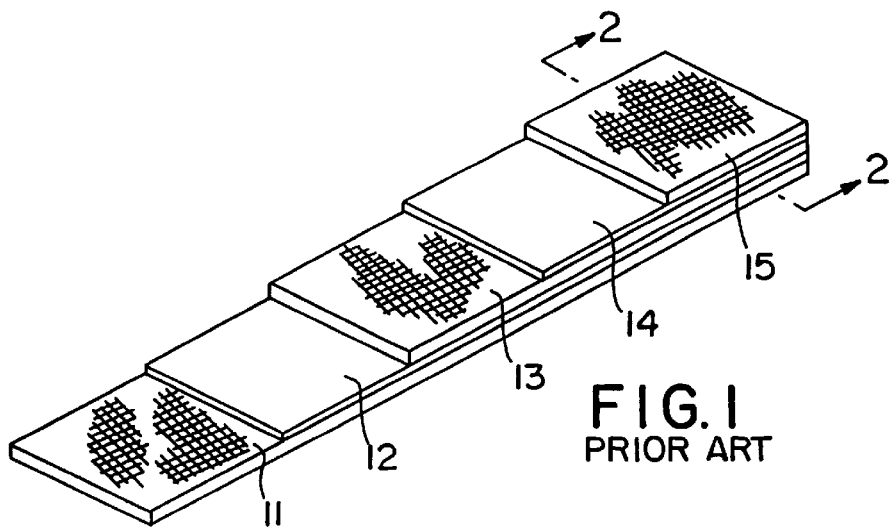
FIG. 1
PRIOR ART
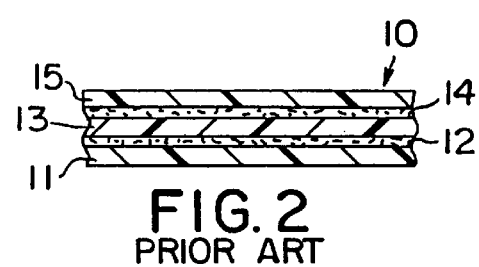
FIG. 2
PRIOR ART
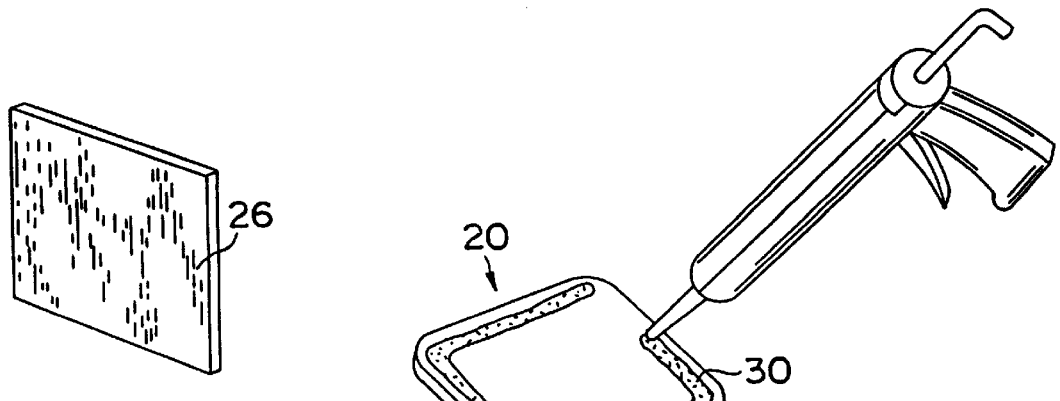
FIG. 5
FIG. 6

EXPANSION JOINT PATCH APPARATUS

BACKGROUND OF THE DISCLOSURE

The present invention is directed to an expansion joint patch apparatus and, more specifically, to an expansion joint patch apparatus for repairing or patching failed or torn fabric expansion joints. The present invention is also directed to a method for forming a fluoroelastomer patch for repairing fabric expansion joints, as a reinforcement material for existing fluoroelastomer expansion joints and/or as a reinforcement material for new-style fluoroelastomer expansion joints, which reduce material costs and may improve performance.

Fluoroelastomers (FKM), such as Viton® or Fluorel®, are high performance elastomers having outstanding resistance to chemical attack, abrasion, weathering, ozone, oil and heat aging as compared to any other elastomer. FKM are among the many elastomers and other objects commonly used in expansion joints.

Traditional expansion joint patch apparatuses, as shown in FIGS. 1 and 2, have been utilized for many years. These patches, of a material often used for air and gas ducting systems, usually comprise five (5) layers: 1) a cured external cover layer; 2) a fiberglass fabric reinforcing ply; 3) a cured skim stock; 4) a fiberglass fabric reinforcing ply; and 5) a cured inside cover layer. However, this five-piece construction can be too rigid and typically encounters difficulty in conforming to the existing shape of failed expansion joint belting. The present invention is substantially comparable in strength to the non-coated, pressed material and adequately repairs particular torn or failed expansion joint belting.

Expansion joint patch apparatuses have also been formed by dipping substrate materials, such as fiberglass, into various highly fluoronated elastoplastic and fluoroplastic solutions, such as PTFE/Teflon®. However, fluoroplastics do not bond to fluoroelastomers, such as Viton® or Fluorel®. Further, expansion joint patch apparatuses have been formed by utilizing raw, uncured Viton® to hot splice the patch member onto the expansion joint with high temperature and pressure to form a secure bond. However, adhesive caulks, such as Fluorodyn™ Viton® caulk, are not compatible with hot splicing.

It is therefore an object of the present invention to provide a more economical apparatus for repairing or patching failed expansion joint belting.

It is also an object of the present invention to provide an acid, tear and high temperature resistant expansion joint patch apparatus.

It is a further object of the present invention to provide a thinner, more flexible patch apparatus for adhering to the existing shape of failed expansion joint belting.

It is yet another object of the present invention to provide a woven, substrate material completely coated with a fluoroelastomer solution for adhering to the existing shape of failed expansion joint belting.

It is also an object of the present invention to provide a reinforcement material for existing fluoroelastomer expansion joints utilizing the same technology as the patch member.

It is yet another object of the present invention to provide a reinforcement material for new-style fluoroelastomer expansion joints utilizing the same technology as the patch member.

These and other objects of the invention will become apparent in light of the present specification, claims and drawings.

SUMMARY OF THE INVENTION

The invention comprises an expansion joint patch apparatus for repairing failed or torn existing expansion joint belting having a substantially flat, woven, substrate material, and a cured solution of suspended elastomer to coat the substrate material, with the substrate material being fully impregnated with the elastomer.

The substrate material is selected from the group consisting of aramid, fiberglass, corrosion resistant alloy wire, polyester, ceramic and kevlar fabrics. Preferably, the substrate material is a fiberglass fabric having a temperature capability of up to 1000° Fahrenheit.

The elastomer is selected from the group consisting of chloroprene, chlorosulfonated polyethylene, ethylene propylene, chloronated isobutylene isoprene, fluoroelastomers and silicon rubbers. Preferably, the elastomer is a fluoroelastomer, such as copolymers, dipolymers and terpolymers. These fluoroelastomers are resistant to chemical, oils and heats.

The patch apparatus further comprises an adhesive caulk for sealing the coated substrate material to an expansion joint region to maintain attachment of the substrate material and the expansion joint region. The caulk also ensures sealing between the substrate material and the expansion joint region, while preventing corrosion in the expansion joint. Preferably, the caulk is a single-component caulk, such as Fluorodyn™ Viton® caulk, that is flexible and provides leakproof sealing, for use in corrosive environments.

The invention further comprises a method for forming a fluoroelastomer patch for repairing fabric expansion joints. The method comprises the steps of (1) forming a patch substrate; (2) impregnating the patch substrate with a volatile solution of suspended elastomer; (3) curing the patch substrate to form a thin, dry patch member to repair a tear region having a particular shape; (4) preparing the tear region by first cleaning and then priming both surfaces of the tear region with a fluoroelastomer cleaner/primer; (5) applying an adhesive caulk to at least one, and preferably both, of the primed surfaces of an expansion joint; (6) positioning the patch member over the entirety of the tear region; and (7) curing the adhesive caulk to seal the patch member to the tear region.

The method for forming a fluoroelastomer patch may further include the step of fastening the patch member to the tear region.

Preferably, the patch substrate has a dimension at least two inches greater than the shape of the tear region.

BRIEF DESCRIPTION OF THE DRAWINGS

FIG. 1 is a perspective cutaway view of an expansion joint patch apparatus according to the prior art;

FIG. 2 is a cross-sectional view of the prior art of FIG. 1, taken along lines 2—2 and looking in the direction of the arrows;

FIG. 5 is a perspective view of the expansion joint patch apparatus of FIG. 3, after impregnating and curing the substrate material with suspended elastomer solution;

FIG. 6 is a perspective view of adhesive caulk being positioned on the expansion joint patch apparatus of FIG. 5.

DETAILED DESCRIPTION OF THE DRAWINGS

Figure 3:
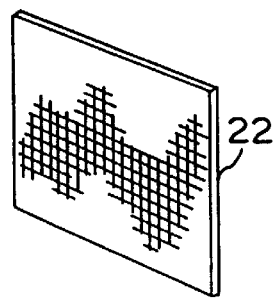
FIG. 3 is a perspective view of the substrate material for an expansion joint patch apparatus according to the preferred embodiment of the present invention.

While this invention is susceptible of embodiment in many different forms, there is shown in the drawings and will be described herein in detail, a specific embodiment, with the understanding that the present invention is to be considered as an exemplification of the principles of the invention and is not intended to limit the invention to the embodiment illustrated.

Traditional expansion joint patch apparatus 10, as shown in FIGS. 1 and 2, has been utilized for many years. This patch, of a material often used for air and gas ducting systems, usually comprises five (5) layers: a cured external cover layer 15; a fiberglass fabric reinforcing ply 14; a cured skim stock 13; a fiberglass fabric reinforcing ply 12; and a cured inside cover layer 11. However, this five-piece construction can often be too rigid and typically encounters difficulty in conforming to the existing shape of failed expansion joint belting. Moreover, the present invention is substantially comparable in strength to the non-coated, pressed material and adequately repairs particular torn or failed expansion joints. Prior art patches can delaminate within themselves and typically are more prone to separation from the tear region of an expansion joint.

Expansion joint patch apparatuses have also been formed by dipping substrate materials, such as fiberglass, into various highly fluoronated elastoplastic and fluoroplastic solutions, such as PTFE/Teflon®. However, fluoroplastics do not bond to fluoroelastomers, such as Viton® or Fluorel®. Further, expansion joint patch apparatuses have been formed by utilizing raw, uncured Viton® to hot splice the patch member onto the expansion joint with high temperature and pressure to form a secure bond. However, adhesive caulks, such as Fluorodyn™ Viton® caulk, are not compatible with hot splicing.

The expansion joint patch apparatus 20 of the present invention is shown in FIGS. 4–7 as comprising substrate material 22 (as shown in FIG. 3), and impregnated patch member 26 from elastomer solution 24. Rather than rely upon a 5-layer laminate of Viton® and fiberglass fabric, patch apparatus provides a thinner, more flexible patch apparatus for adhering to the existing shape of failed expansion joint belting 28. Moreover, patch apparatus 20 is acid, tear and high temperature resistant.

Substrate material 22 for patch apparatus 20 is selected from any one of the following fabric materials: aramid, fiberglass, corrosion resistant alloy wire, polyester, ceramic and kevlar. Although any of these five (5) substrate materials can be used in the manufacture of patch apparatus 20, preferably, a fiberglass substrate material having a high temperature capability and a patch member that is substantially chemical resistant is utilized to maximize the strength of patch apparatus 20.

The specific substrate fabric material used may depend on various factors, such as temperature capabilities and chemical resistance. For example, polyester can handle a continuous temperature of only 250° Fahrenheit; whereas, corrosion resistant alloy wire can handle a continuous temperature of 2500° Fahrenheit. Moreover, certain chemicals, such as dilute $H_2SO_4$, concentrated $H_2SO_4$, $SO_2$ and $SO_3$, have little or no effect on the chemical resistance of ceramic. Conversely, caustic solution has a severe effect on the chemical resistance of ceramic. Ultimately, it is the unique performance requirement of each specific application that will dictate the best underlying substrate material to be used.

Figure 4:
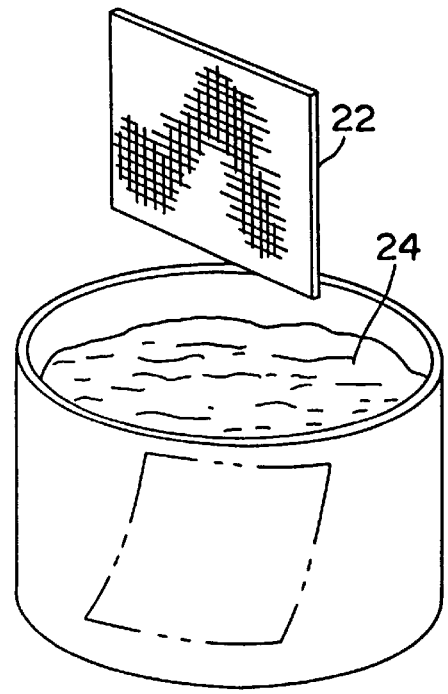
FIG. 4 is a perspective view showing the expansion joint patch apparatus of FIG. 3, being dipped into the suspended elastomer solution.
Figure 7:
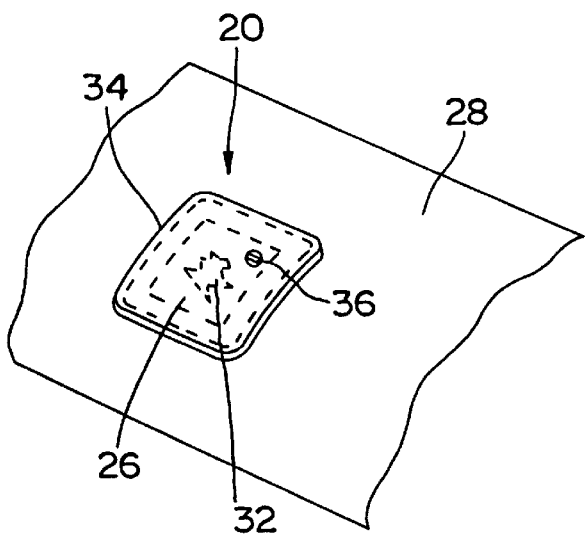
FIG. 7 is a perspective view of a repaired expansion joint, patched with the expansion joint patch apparatus according to the preferred embodiment of the present invention.

As shown in FIG. 4, substrate material 22 is dipped into a suspended elastomer solution 24 to, in turn, coat substrate material 22 and reduce the permeability of patch apparatus 20. Thus, substrate material 22 is fully emulsed with a fluoroelastomer compound, and, after curing, the resulting patch member 26 (see FIG. 5) is extremely flexible. This flexibility allows patch member 26 to easily conform to expansion joint belting 28 (see FIG. 7). Patch member 26 is acid resistant, has a continuous temperature resistance of up to 400° Fahrenheit, with an intermittent temperature resistance of up to 750° Fahrenheit (for fiberglass fabric), and has a high strength resistance. The reinforcement material of expansion joint belting 28 may comprise the same chemical composition as patch member 26. Moreover, expansion joint belting 28 may comprise the same chemical composition as patch member 26.

Elastomer solution 24 is selected from any one of the following coatings: chloroprene (commonly known as neoprene), chlorosulfonated polyethylene (commonly known by the trade name Hypalon™), ethylene propylene (commonly known as EPDM), chlorinated isobutylene isoprene (commonly known as chlorobutyl), fluoroelastomers (such as Viton® and Fluorel®) and silicone rubbers.

Preferably, elastomer solution 24 is a fluoroelastomer, such as DuPont's Viton® fluoroelastomer or Dyneon's Fluorel® fluoroelastomer. These high performance elastomers have outstanding resistance to chemicals, oils and heats compared to any other elastomer. These elastomers are available as copolymers (vinylidene fluoride hexafluoropropylene), dipolymers or terpolymers (vinylidene fluoride tetrafluoroethylene). Specifically compounded terpolymers are utilized in flue gas and scrubber systems. These fluoroelastomers have excellent abrasion and weathering resistance.

The specific elastomer solution used may depend on a variety of factors, such as material temperature, chemical resistance to $H_2SO_4$ acid, abrasion resistance and environmental resistance. For example, fluoroelastomers can handle an intermittent temperature up to 750° Fahrenheit; whereas, neoprene can only handle an intermittent temperature up to 250° Fahrenheit. Moreover, ozone, oxidation and sunlight have little or no effect of fluoroelastomers. Conversely, these same three environmental conditions have a minor to moderate effect on neoprene. Ultimately, it is the unique performance requirement of each specific application that will dictate the best elastomer solution to be used.

As shown in FIG. 6, adhesive caulk 30 is utilized to seal patch member 26 to failed or torn expansion joint belting 28. Caulk 30 can have different viscosities to maximize attachment to various ones of the repaired expansion joints. One such caulk 30 is Fluorodyn™ Viton® caulk, manufactured by Thermodyn Corporation, based on Viton® fluoroelastomer and produced in conjunction with DuPont Dow Elastomers. Caulk 30 is compounded with seventy-five percent (75%) solids making it an easy to apply, single component caulk. Caulk 30 provides excellent corrosion resistance, as well as increased resistance after curing to virtually all chemicals, including nitric, sulfuric and hydrochloric acids. Caulk 30 is best utilized in harsh, corrosive environments that require flexibility, leakproof sealing and high resistance to permeation.

In operation, it must first be determined what size area is to be repaired or patched on an existing fabric expansion joint. Expansion joint belting 28 should be cool prior to patching to ensure a proper bond between expansion joint belting 28 and patch member 26. Next, all loose material is trimmed and the area surrounding tear region 32 is wiped clean. It is extremely important to remove all oils, contaminants and dirt to maximize adhesion of caulk 30 to tear region 32 (see FIGS. 6 and 7).

Once expansion joint belting 28 is adequately cleaned, patch member 26 is cut a minimum of two (2) inches larger than the hole to be covered and patch member edges 34 are rounded. Next, one side of the patch member surface is primed with an elastomer primer (such as Viton® or Fluorel®), together with an exposed side of the expansion joint belting 28, which allows both primed surfaces to dry completely. Upon drying of the primed surfaces, apply a thick bead of adhesive caulk 30 to the primed surface of expansion joint belting 28. Patch member 26 is then applied to tear region 32 and held in place by applying constant pressure until secure, and cured for a minimum of twenty-four (24) hours.

All edges of patch member 26 are then painted with a surface coating (such as Fluorodyn™ Viton® caulk) to seal rounded patch member edges 34. Finally, patch apparatus 20, including patch member 26, caulk 30 and an elastomer primer can be stepped cured for forty-eight (48) hours by increasing the temperature fifty degrees (50) every thirty (30) minutes until three hundred twenty-five degrees Fahrenheit (325) has been reached for one hour, or until maximum system temperature has been reached, if lower. Screw 36, or other fasteners such as rivets, bolts, etc., may be used to secure patch member 26 to expansion joint belting 28. Once secured, screw 36 is painted with Fluorodyn™ Viton® caulk.

The foregoing description and drawings merely explain and illustrate the invention, and the invention is not limited except insofar as the appended claims are so limited, as those skilled in the art who have the disclosure before them will be able to make modifications and variations therein without departing from the scope of the invention.

What is claimed is:

1. An expansion joint patch apparatus for repairing failed or torn existing expansion joint belting, the patch apparatus comprising:

a substantially flat, woven, substrate material for repairing failed expansion joints;

the substrate material being selected from the group consisting of aramid, fiberglass, corrosion resistant alloy wire, polyester, ceramic and poly-paraphenylene terephthhalamide fiber fabrics;

a volatile solution of suspended elastomer coating the substrate material to, in turn, reduce the permeability of the patch apparatus, the substrate material being substantially, fully impregnated with the elastomer;

the elastomer being selected from the group consisting of chloroprene, chlorosulfonated polyethylene, ethylene propylene, chlorinated isobutylene isoprene, fluoroelastomers and silicone rubbers;

an adhesive caulk for sealing the coated substrate material to an expansion joint region to maintain attachment of the substrate material and the expansion joint region, and to ensure sealing of the substrate material and the expansion joint region while preventing corrosion in the expansion joint, the caulk being flexible and providing leakproof sealing, wherein the caulk includes vinylidene fluoride and hexafluoropropylene.

2. The patch apparatus according to claim 1 wherein the substrate material is a fiberglass fabric having a temperature capability of up to 1000° Fahrenheit and the patch apparatus is substantially chemical resistant.

3. The patch apparatus according to claim 1 wherein the elastomer is a fluoroelastomer, the fluoroelastomer being selected from the group consisting of copolymers, dipolymers and terpolymers, and the fluoroelastomer being resistant to chemicals, oils and heats.

* * * * *

UNITED STATES PATENT AND TRADEMARK OFFICE
CERTIFICATE OF CORRECTION

PATENT NO.    : 6,306,781 B1
DATED         : October 23, 2001
INVENTOR(S)   : McGrath Page 1 of 1

It is certified that error appears in the above-identified patent and that said Letters Patent is hereby corrected as shown below:

Column 3,
Line 45, after "patch apparatus" insert -- 20 --

Column 4,
Line 45, delete "of" insert -- on --

Signed and Sealed this

Twenty-ninth Day of October, 2002

Attest:

Attesting Officer

JAMES E. ROGAN
Director of the United States Patent and Trademark Office